(12) United States Patent
Cronauer et al.

(10) Patent No.: US 6,188,874 B1
(45) Date of Patent: *Feb. 13, 2001

(54) CONTROL AND TELEMETRY SIGNAL COMMUNICATION SYSTEM FOR GEOSTATIONARY SATELLITES

(75) Inventors: Thomas D. Cronauer, Nokesville; Anne M. Cady; Kenneth R. Schulz, both of Manassas, all of VA (US); Pablito B. Yra, Union City; Joe Burri, Fremont, both of CA (US)

(73) Assignee: Lockheed Martin Corporation, Manassas, VA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/884,675

(22) Filed: Jun. 27, 1997

(51) Int. Cl.$^7$ .............................. H04B 7/185; B64G 1/00
(52) U.S. Cl. .............................. 455/12.1; 455/8; 700/79; 700/84; 244/158 R
(58) Field of Search .............................. 455/8, 12.1, 427; 370/321, 323, 326, 366; 700/79, 84, 9; 244/158 R, 159, 161

(56) References Cited

U.S. PATENT DOCUMENTS

| | | | |
|---|---|---|---|
| 4,037,202 | * 7/1977 | Terzian | 712/245 |
| 4,218,742 | * 8/1980 | Carlton et al. | 364/200 |
| 4,425,639 | * 1/1984 | Acampora et al. | 370/323 |
| 4,450,572 | * 5/1984 | Stewart et al. | 375/87 |
| 4,567,589 | * 1/1986 | Lecomte et al. | 370/366 |
| 4,763,129 | * 8/1988 | Perrotta | 342/356 |
| 4,809,006 | * 2/1989 | Dar | 342/352 |
| 4,862,350 | * 8/1989 | Orr et al. | 364/200 |
| 4,888,769 | * 12/1989 | Deal | 370/321 |
| 4,967,400 | * 10/1990 | Woods | 367/21 |
| 5,113,523 | * 5/1992 | Colley et al. | 395/800 |
| 5,152,482 | * 10/1992 | Perkins et al. | 244/158 R |
| 5,187,805 | * 2/1993 | Bertiger et al. | 455/12.1 |
| 5,239,448 | 8/1993 | Perkins et al. | 361/764 |
| 5,274,627 | * 12/1993 | De Santis | 370/323 |
| 5,297,006 | 3/1994 | Mizukoshi | 361/704 |
| 5,303,121 | 4/1994 | Thornberg | 361/760 |
| 5,311,407 | 5/1994 | Lumbard | 361/813 |
| 5,377,181 | * 12/1994 | Rogers | 370/366 |
| 5,384,691 | 1/1995 | Neugebauer et al. | 361/794 |
| 5,448,766 | * 9/1995 | Sanning et al. | 455/8 |
| 5,479,396 | * 12/1995 | Kusano | 370/16 |
| 5,485,383 | * 1/1996 | Schreiber | 364/434 |
| 5,502,621 | 3/1996 | Schumacher et al. | 361/760 |
| 5,530,335 | * 6/1996 | Decker et al. | 320/5 |
| 5,566,344 | 10/1996 | Hall et al. | 395/800 |
| 5,594,939 | * 1/1997 | Curello et al. | 455/12.1 |
| 5,696,495 | * 12/1997 | Pietzsch et al. | 370/235 |
| 5,710,935 | * 1/1998 | Barker et al. | 395/800 |
| 5,712,850 | * 1/1998 | Elia et al. | 370/326 |
| 5,796,715 | * 8/1998 | Patterson et al. | 370/323 |
| 5,822,312 | * 10/1998 | Peach et al. | 370/323 |
| 5,905,781 | * 5/1999 | McHale et al. | 379/93.14 |

* cited by examiner

Primary Examiner—Reinhard J. Eisenzopf
Assistant Examiner—Duc Nguyen
(74) Attorney, Agent, or Firm—Venable; Ralph P. Albrecht

(57) ABSTRACT

A geosynchronous satellite control and telemetry communication system has branch modules distributed throughout the satellite which serially interface clusters of control and/or analog nodes to the central command and data handling processor. Each branch module is connected to the central command and data handling processor by serial data channels. The branch modules are physically located close to the control/telemetry nodes for which they serve as interfaces to the central command and data handling processor and where appropriate are integrated into the satellite subsystems themselves.

18 Claims, 4 Drawing Sheets

CONTROL AND TELEMETRY SIGNAL COMMUNICATION SYSTEM FOR GEOSTATIONARY SATELLITES

BACKGROUND OF THE INVENTION

1. Field of the Invention

This invention relates to an improved control and telemetry signal communication system for satellites, and more particularly to a communications system between a central on-board computer and nodes located throughout the satellite.

2. Description of the Prior Art

In geostationary satellites, a central, on-board command and data handling computer in the satellite communicates with more than 1000 nodes physically located throughout the satellite in order to adequately control and monitor its operation. FIG. 1 is a functional block diagram of a typical prior art satellite telemetry and control system, but showing only six nodes in order to simplify the drawing. Here, each telemetry analog node (here nodes 2 and 5) (e.g. a thermistor monitoring the temperature at a region of the satellite) is connected by a separate pair of wires 12 to provide an analog input to an intermediate control processor 14. Similarly, each digital node 13 (nodes 1, 3, 4 and 6) is connected to the control processor 14 by a separate, dedicated data bus 17. Each data bus may be comprised of a number of parallel wires for parallel data transmission or may comprise a serial data channel for serial data transmission depending upon the node requirements. A redundant digital data bus 19 connects the control processor 14 to a central command and data handling processor 16. The system includes a communications channel 18 for sending and receiving data to and from ground stations while the satellite is in orbit. As will be appreciated by those skilled in the art, the hardware, software, and cabling of the prior art system used to monitor and control the operation of the satellite is expensive, heavy, requires considerable power to operate, and is difficult to integrate into and test as part of the overall satellite system.

An object of this invention is the provision of an analog telemetry and digital command communications system for satellites which provides a uniform interface between the nodes and the central computer and significantly reduces the amount of cabling needed between the nodes and the central computer.

SUMMARY OF THE INVENTION

Briefly, this invention contemplates the provision of a geosynchronous satellite control and telemetry communication system in which branch modules distributed throughout the satellite serially interface clusters of control and/or analog nodes to the central command and data handling processor. Each branch module is connected to the central command and data handling processor by a serial data channel; in a preferred embodiment of the invention the serial data channel is a lightweight, shielded, twisted wire pair. The branch modules are physically located close to the control/telemetry nodes for which they serve as interfaces to the central command and data handling processor and where appropriate are integrated into the satellite subsystems themselves. Each branch module responds to data commands issued by the central command and data handling processor over the twisted wire pair connected to the module. The central command and data handling processor is programmed to implement a system time line, issuing a recurring series of commands to the branch modules. Upon receipt of a command from the central command and data handling processor, the branch module decodes the command, carries out the commanded action by generating, or sampling, one or more signals at its node interface, and responds back to the central command and data handling processor with the node status. The central command and data handling processor then issues additional commands to the same branch module or moves on to another branch module so that the central flight computer addresses all critical control points and telemetry points during one system cycle.

In a preferred embodiment of the invention, the branch module includes a dual sided, hybrid assembly, with digital and analog integrated circuits mounted on one side of a wiring substrate and oscillator and passive components mounted on the other side. The module has a single d.c. power input, and additional voltages needed to process analog signal inputs are generated by the module. This assembly is mounted in a hermetically sealed housing.

BRIEF DESCRIPTION OF THE DRAWINGS

The foregoing and other objects, aspects and advantages will be better understood from the following detailed description of a preferred embodiment of the invention with reference to the drawings where like reference numbers refer to like components in the various figures and in which.

DETAILED DESCRIPTION OF A PREFERRED EMBODIMENT

Figure 1:
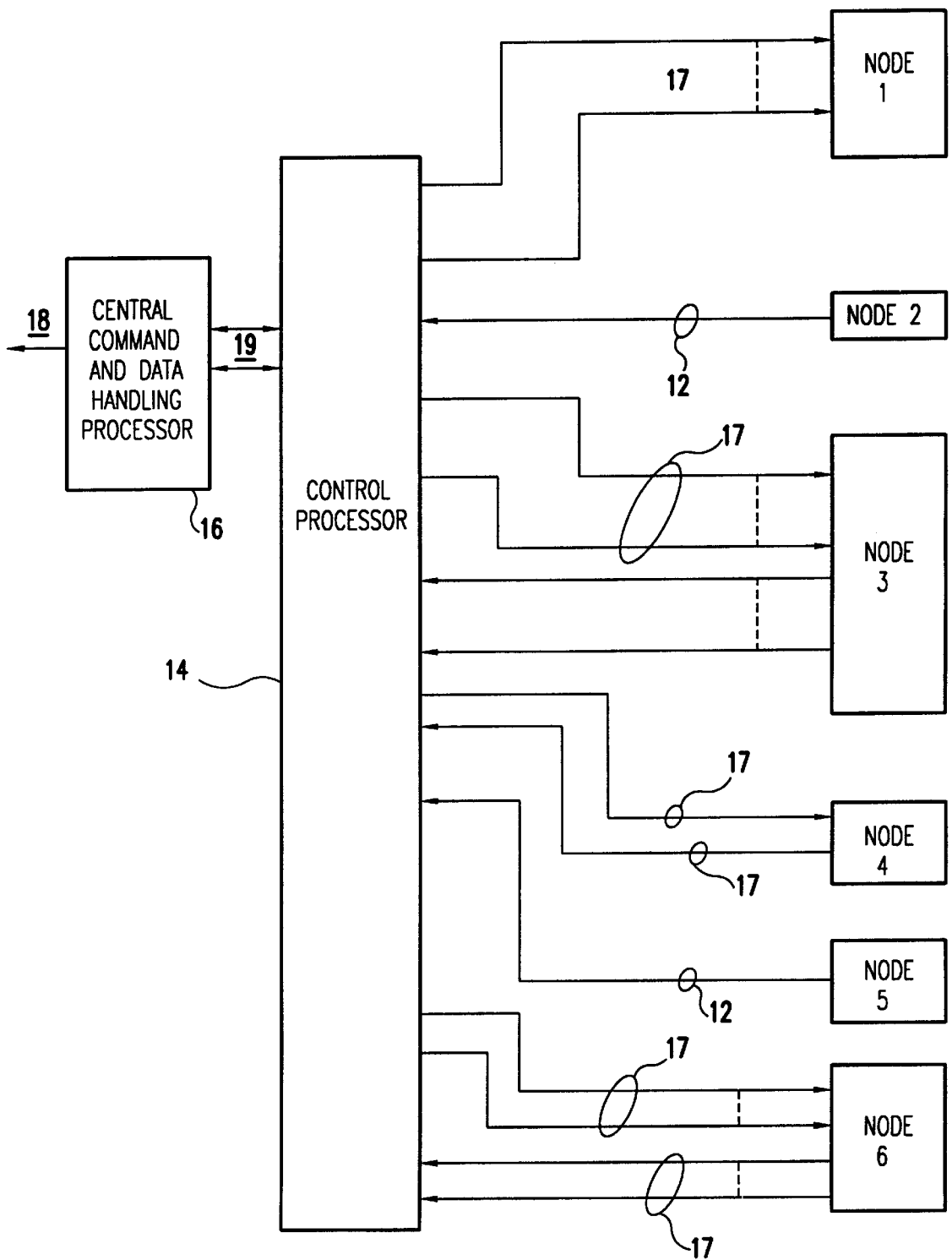
FIG. 1 is a block diagram of a prior art satellite telemetry and control system.
Figure 2:
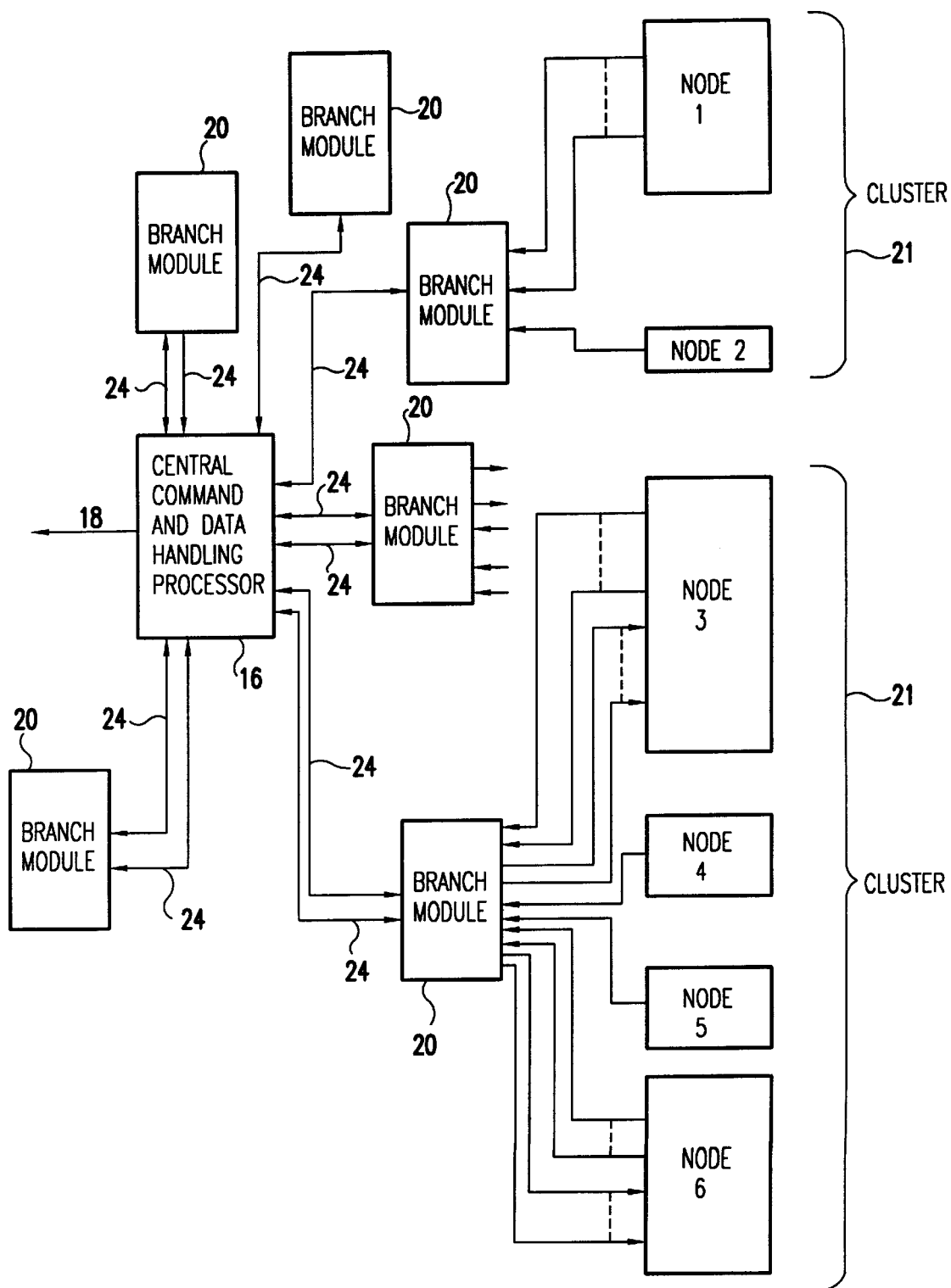
FIG. 2 is a block diagram of a satellite telemetry and control system in accordance with the teachings of this invention.

Referring now to FIG. 2, a number of branch modules 20 are located throughout the interior of a satellite. Each branch module is located in close proximity to one or preferably to a cluster 21 of digital and/or analog nodes in close physical proximity to one another. Here, nodes 1 and 2 are in one cluster and nodes 3, 4, 5 and 6 are in another cluster. A serial digital data communications channel 24 directly couples each node to the central control and data handling computer 16. Preferably (as shown) two channels 24 are used to couple each branch module to the computer in order to provide a redundant coupling between each branch module and the computer. A twisted wire pair is an exemplary implementation of a low cost, lightweight, serial communications channel 24.

Figure 3:
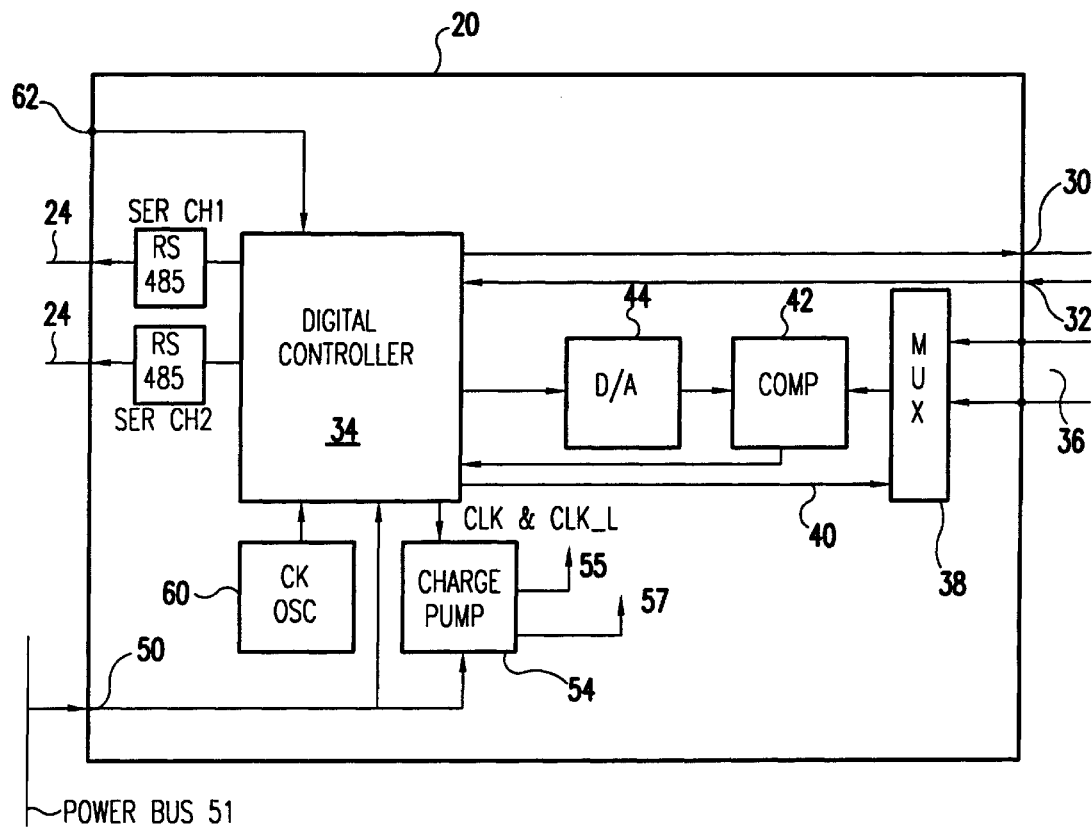
FIG. 3 is a functional block diagram of one embodiment of branch module in accordance with the teachings of this invention.

Referring now to FIG. 3 in addition to FIG. 2, each branch module includes, in this specific embodiment of the invention, fifty-six digital output terminals 30 and fifty-six digital input terminals 32. These terminals are connected directly to a digital controller 34 which may be implemented as an application specific integrated circuit (ASIC). Thirteen analog input terminals 36 are also provided; these analog inputs are coupled to a multiplexer 38, which selects one of the thirteen in accordance with a control signal from the controller 34 on line 40. The output of the multiplexer 38 is coupled as one input of a comparator 42 whose other input is the output of a digital-to-analog convertor 44. The controller 34 provides a digital input to the convertor 44, and the output of the comparator 42 is coupled as an input to the controller 34.

A port on the branch module provides a serial communications channel preferably using a standard communications protocol (e.g. an HDLC protocol) for communication between the branch module and the central computer over the twisted wire pair 24. In the preferred embodiment shown, the module has two, redundant communications ports labeled in the drawing Ser. Ch 1 and Ser. Ch 2. The module also includes a terminal 50 to which a power bus 51 (e.g. +5 volt) for all the modules is connected. In addition to providing an operating voltage for the module components, the supply voltage is also coupled to a charge pump 54 to provide operating voltages outputs 55 and 57 for internal module use. As will be appreciated by those skilled in the art, a charge pump can be implemented as a voltage multiplier using switched capacitors and diodes. The module has an internal clock source 60. The module has several hardwired input ports (labeled 62) which allow selection of certain operating parameters, such as, for example, the branch module hardwired addresses.

The digital controller 34 is comprised of hardwired state machines that perform several functions. In response to control commands and status requests, transmitted to it from the central control computer over either serial channel (24), it decodes the address of the module being addressed by the computer, then performs the requested action if the transmitted address matches its hardwired address. In response to a computer command to a node, it generates the appropriate action then transmits a response over same twisted wire pair. In response to a central computer command to read the status of a branch module, either a digital node or an analog node, the controller 34 decodes the command, executes the command, and then responds back to the computer. Digital status information is encoded as the binary status of one or more of the digital input lines 32. The controller 34 generates a serial data stream response based on the status of the addressed digital lines, and transmits the response to the central computer. Analog information from each analog node connected to a branch module 20 is available as a voltage level on one of the thirteen analog lines 36. Here, based on the address of the node, the controller 34 signals the multiplexer 38 to connect the analog input connected to the addressed node to one input of the comparator 42. At the same time, a digital reference value for the addressed node is generated by the digital computer. This digital reference value is converted to an analog voltage by the digital-to-analog convertor 44 and the analog output voltage of the convertor is coupled as an input to the comparator 42. The comparator provides digital information back to the digital controller. The digital controller cycles through several reference values as it performs a 10-bit analog-to-digital conversion through successive approximation. When the conversion is complete, the digital controller converts the 10-bit answer to a digital data stream and transmits the digital data stream to the central computer.

In the preferred embodiment of the invention, the central computer establishes a system time line and the nodes connected to branch modules are addressed sequentially so that all the nodes in the satellite are addressed in one system cycle.

Figure 4:
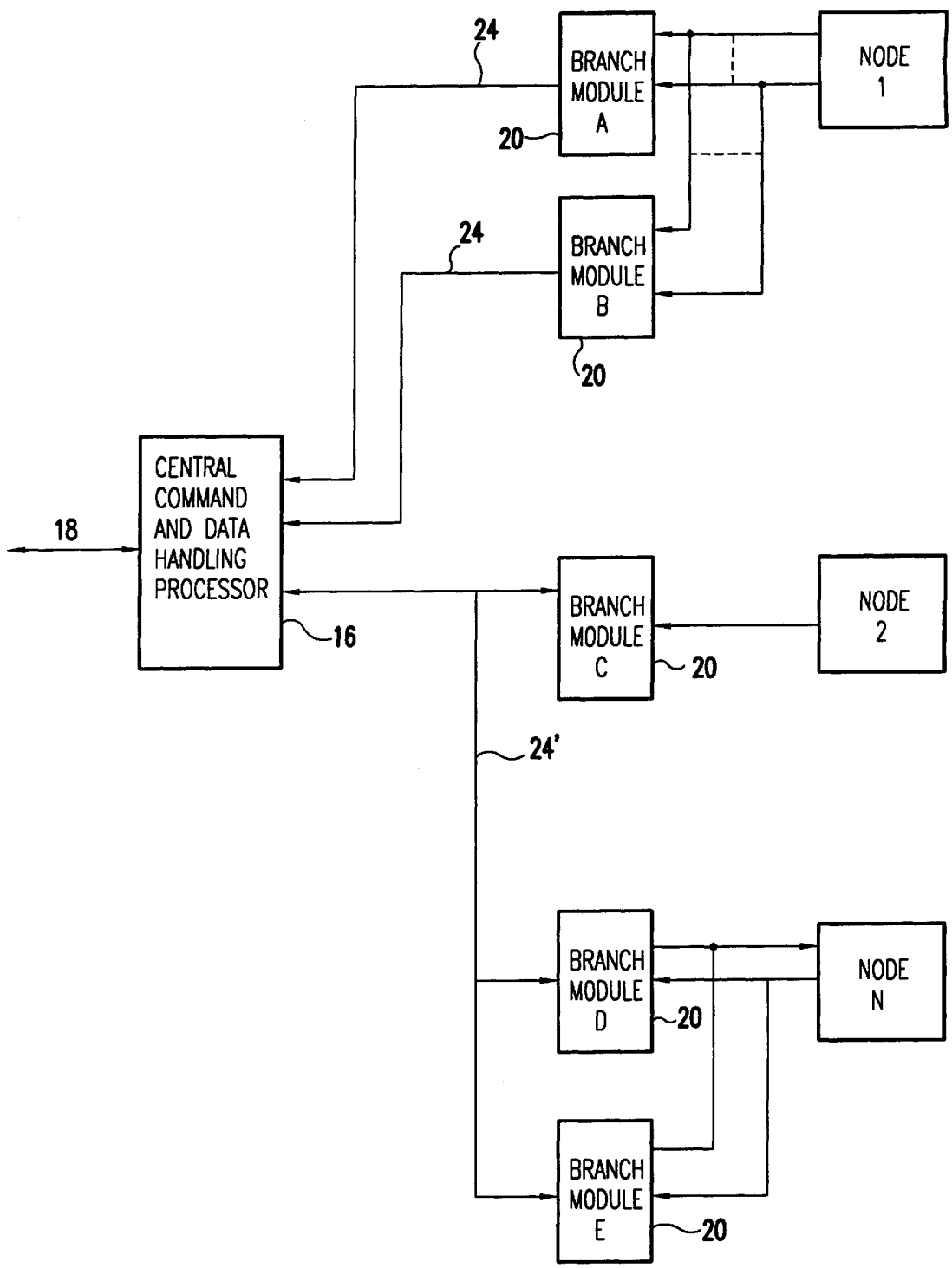
FIG. 4 is a block diagram similar to FIG. 2, illustrating cold spare and multiple drop features of the invention.

Referring now to FIG. 4, it shows two additional aspects of the invention. In one aspect called cold spare, two, or possibly more, branch modules are connected to the same node or nodes. Illustrated here, the branch modules labeled A and B are each connected to node 1. One module (e.g. module A) is normally powered and the other module (e.g. module B) is normally not powered. In the event of a failure of module A or the channel or channels 24 connecting module A to the processor 16, the processor detects the failure, powers up module B, and turns off the power to module A, thus providing an additional redundancy in the system. The other aspect illustrated in FIG. 4 is the ability to service, if desired, more than one branch module 20 from a single serial channel 24. Here, as illustrated, channel 24' serves module C and module D with module D's cold spare module E.

While the invention has been described in terms of a single preferred embodiment, those skilled in the art will recognize that the invention can be practiced with modification within the spirit and scope of the appended claims.

We claim:

1. A system for controlling and monitoring a spacecraft, comprising:
    a central computer;
    a plurality of nodes in the spacecraft grouped in a cluster of nodes based on a close physical proximity of nodes in said cluster;
    a plurality of said clusters of said plurality of nodes;
    a branch module respectively located in close physical proximity to each cluster;
    each of said branch modules including a plurality of digital input terminals and a plurality of analog input terminals coupled to one or more nodes of said plurality of nodes, a plurality of digital output terminals coupled to one or more nodes of said plurality of nodes, and a serial digital output terminal coupled to said central computer via a multi-drop capable, low cost, lightweight serial communications channel;
    wherein each of said branch modules includes at least two redundant serial digital output terminals coupled to said central computer by at least two redundant multidrop capable, low cost, lightweight serial communications channels.

2. The system according to claim 1, wherein said multi-drop capable, low cost, lightweight serial communications channel is a twisted wire pair.

3. The system according to claim 1, wherein each of said at least two redundant multidrop capable, low cost, lightweight serial communications channels is a twisted wire pair.

4. The system according to claim 1, further including a pair of said branch modules redundantly coupled to one or more nodes, one of said pair of branch modules powered and the other of said pair of branch modules not powered, wherein said other of said pair of branch modules is a cold spare, and wherein said central computer is configured to detect a failing one of said pair of said branch modules, and powers up said cold spare of said branch modules and turns off power to said failing one of said pair of said branch modules.

5. The system according to claim 1, wherein at least one of said plurality of said digital input and output terminals is coupled to two or more of said branch modules.

6. The system according to claim 1, wherein said central computer is configured to sequentially address all of said plurality of nodes.

7. The system according to claim 6, wherein said central computer is configured to address all of said plurality of nodes in one system cycle.

8. The system according to claim 1, wherein said one or more nodes of said plurality of nodes of said cluster include telemetry analog nodes.

9. The system according to claim 8, wherein said telemetry analog nodes include a thermistor monitoring temperature of a region.

10. The system according to claim 8, wherein said branch module is physically located close in proximity to said telemetry analog nodes for which said branch module serves as an interface to said central computer.

11. The system according to claim 1, wherein said branch module includes a single fixed hybrid assembly fabricated from a single wiring substrate.

12. The system according to claim 1, wherein said system further comprises a spacecraft coupled to said central computer.

13. The system according to claim 12, wherein said spacecraft is a satellite.

14. The system according to claim 12, wherein said spacecraft is a high altitude airplane.

15. The system according to claim 1, wherein said plurality of digital input terminals includes at least fifty-six terminals, said plurality of digital output terminals includes at least fifty-six terminals, and said plurality of analog input terminals includes at least thirteen terminals.

16. The system according to claim 1, wherein said multi-drop capable, low cost, light weight serial communications channel uses an HDLC communications protocol.

17. The system according to claim 1, wherein said multi-drop capable, low cost, light weight, serial communications channel is coupled to two or more of said branch modules.

18. The system according to claim 1, wherein said multi-drop capable, low cost, light weight, serial communications channel is an RS-485 serial channel.

* * * * *